(No Model.)

J. A. RAPP.
CAR AXLE BOX.

No. 243,792.

Patented July 5, 1881.

WITNESSES:
T. K. Parsons.
Geo. A. Burnett.

Jackson A. Rapp,
INVENTOR

BY J. R. Drake,
ATTORNEY

UNITED STATES PATENT OFFICE.

JACKSON A. RAPP, OF OLEAN, NEW YORK.

CAR-AXLE BOX.

SPECIFICATION forming part of Letters Patent No. 243,792, dated July 5, 1881.

Application filed February 18, 1881. (No model.)

*To all whom it may concern:*

Be it known that I, JACKSON A. RAPP, a citizen of the United States, residing at Olean, in the county of Cattaraugus and State of New York, have made certain Improvements in Car-Axle Boxes, of which the following is a specification.

This device is more particularly intended for railroad-car axle-boxes, but it can be used for all horizontal shaftings as well.

The invention will be understood as set forth in the following specification and claim.

Figure 1:
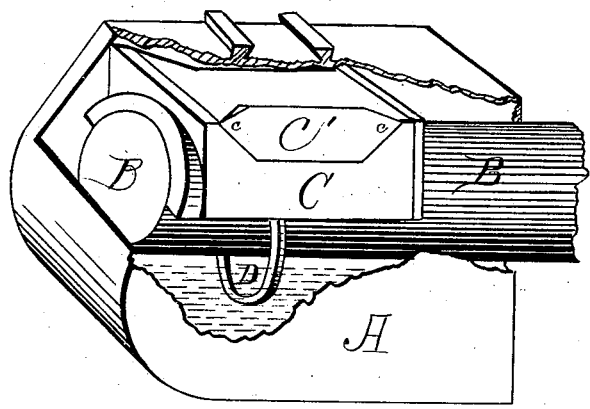
Figure 2:
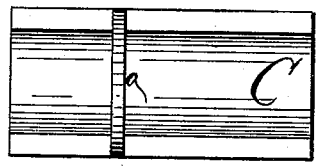
Figure 3:
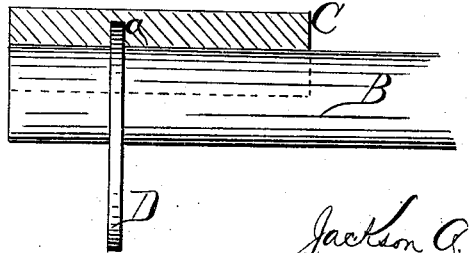

In the drawings, Figure 1 is a perspective of an axle-box, partly in section, showing the outer end of an axle, the ring, &c. Fig. 2 is a bottom plan of the bearing, showing the ring-groove therein; and Fig. 3 is a side elevation of the axle, ring, and a section of the bearings.

A represents an axle-box in which oil and waste are usually employed on all railroad-cars, B the axle, and C the bearing. The bearing C is cut out on the two upper corners, as shown at C', which cut has the sloping ends $c$ $c$. The cuts thus formed make a wedge-shaped connection with the box above, which is conformed thereto, and great security is insured in the position of the bearing as long as it rests upon the axle or other support, but it is readily removable when the pressure from beneath is removed.

D is a metal ring that encircles the axle or shaft B, made of much larger circumference than the axle, so that the lower part will always set in the oil in the box A (see Fig. 1) or the dish in shafting. The ring is retained in place on the shaft by a groove, $a$, formed in the inner part of the bearing C and large enough for the ring to move easily therein. As the axle revolves it carries around with it the oiling-ring D, which takes up with it from the box or dish A oil in a constant stream, thus keeping up a continuous supply to the bearings and shaft.

This simple device in car-boxes will do away entirely with cotton-waste, now so universally in use and which is a great annual expense to railroads. It will also prevent hot boxes and all clogging therein, and the oil can be used over and over, and will thus last a very long time, as there is little or no loss or waste, and will keep clean.

This device is also intended to be used for line horizontal shafting, where it can be employed to equally good advantage. In such cases an upper box or bearing, or its equivalent, will be added to the lower bearing for the ring to run in.

The axle B revolves in the box A, resting against the bearing C above and having no under bearing. The ring D fits snugly but easily in the groove $a$, and as it is revolved by its gentle contact with the axle it meets no object after leaving the oil until it reaches the axle and the upper bearing, when all the oil is delivered at this point, where it is most needed.

I am aware that lubricant-conveyers have been known in which a chain passing round a pulley underneath to keep it taut is used to carry oil to the axle, and also that rings have been used where there is another bearing, and I claim neither of these, as in the case of the chain and pulley great wear upon the axle and upper bearing must ensue, and the pulley increases the amount of mechanism necessary; and in the case of the ring and under bearing the oil is taken off the ring by the lower bearing, and is not allowed its proper and even distribution over the journal.

I am aware that boxes and pillow-blocks have been known having sloping sides; but such without the sloping ends shown at $c$ in the drawings do not serve the full purpose of mine, and I do not claim such.

What I do claim is—

The axle-box described, having the pillow-block C, with cuts C' $c$ $c$ on the upper corners, the box A, conformed thereto and forming the oil-cup beneath the axle, the axle B, and ring D, revolving in a slot, $a$, in the block C, all constructed substantially as set forth.

In witness whereof I have hereunto signed my name in the presence of two subscribing witnesses.

JACKSON A. RAPP.

Witnesses:
J. P. DRAKE,
GEO. A. BURNETT.